United States Patent
Fell et al.

(10) Patent No.: US 6,651,499 B2
(45) Date of Patent: Nov. 25, 2003

(54) CONTROL SYSTEM FOR A VIBRATING STRUCTURE GYROSCOPE

(75) Inventors: Christopher P Fell, Plymouth (GB); Kevin Townsend, Liskeard (GB)

(73) Assignee: BAE Systems plc, Farnborough (GB)

( * ) Notice: Subject to any disclaimer, the term of this patent is extended or adjusted under 35 U.S.C. 154(b) by 0 days.

(21) Appl. No.: 10/221,777

(22) PCT Filed: Mar. 28, 2001

(86) PCT No.: PCT/GB01/01381
§ 371 (c)(1),
(2), (4) Date: Sep. 17, 2002

(87) PCT Pub. No.: WO01/77620
PCT Pub. Date: Oct. 18, 2001

(65) Prior Publication Data
US 2003/0074968 A1 Apr. 24, 2003

(30) Foreign Application Priority Data
Apr. 6, 2000 (GB) .............................................. 0008365

(51) Int. Cl.[7] .............................................. G01C 19/00
(52) U.S. Cl. ................................. 73/504.12; 73/504.13
(58) Field of Search .......................... 73/504.12, 504.13

(56) References Cited

FOREIGN PATENT DOCUMENTS

| EP | 0 492 739 | 7/1992 |
| GB | 2 251 072 | 6/1992 |
| GB | 2 329 471 | 3/1999 |
| WO | 99/02942 A | 1/1999 |
| WO | 99/14557 A | 3/1999 |

*Primary Examiner*—Richard A. Moller
(74) *Attorney, Agent, or Firm*—Nixon & Vanderhye P.C.

(57) ABSTRACT

A vibrating structure gyroscope having a vibrating structure (3) primary drive means (4) and secondary drive means (7) and primary pick-off means (2) an secondary pick-off means (6) is provided with a control system. The control system includes a primary closed control loop (1) for controllably varying the drive signal applied to the primary drive means (4), a secondary closed control loop (5) for controllably varying the drive signal applied to the secondary drive means (7) in order to maintain a null value of the secondary pick-off means (6) and means (30) for actively adjusting the scalefactor in the primary and secondary closed control loops (1, 5). The means (30) includes means (34) for dividing a rate response signal from the loop (5) by a signal indicative of the amplitude of the primary mode vibration. The output form the means (34) is filtered to provide an applied rate output. A variable scalefactor loop (3) uses the output from the means (34) actively to adjust a reference voltage set level of loop (1) to adjust the in loop scalefactor of the system.

11 Claims, 5 Drawing Sheets

CONTROL SYSTEM FOR A VIBRATING STRUCTURE GYROSCOPE

This application is the US national phase of international application PCT/GB01/01381 filed Mar. 28 2001, which designated the US.

FIELD OF THE INVENTION

This invention relates to a control system for a vibrating structure gyroscope particularly, but not exclusively, suitable for use with a silicon micro-machined vibrating structure gyroscope.

Vibrating structure gyroscopes are known using a variety of different mechanical vibratory structures. These include beans, tuning forks, cylinders, hemispherical shells and rings made from ceramic, metal or silicon. A common feature in these known systems is that they are required to maintain a resonance carrier mode oscillation at a natural frequency determined by the mechanical vibratory structure. This provides the linear momentum which produces Coriolis force when the gyroscope is rotated around the appropriate axis.

Advances in micro-machining technology have made it possible to produce vibrating structure gyroscopes from silicon in high volumes and at low cost. Such gyroscopes are being developed for automotive applications such as vehicle dynamic control systems and for car navigation. The performance characteristics of these micro-machined gyroscopes are tailored to meet automotive requirements with the maximum specified rate range typically being plus or minus 100° per second.

Such micro-machined vibrating structure gyroscopes are inherently rugged and of low cost which makes them attractive for use in other more demanding applications such as for aircraft navigation or for guided munitions. These latter applications typically require the gyroscope to operate over a significantly wider range of rotation rates. Whilst it is possible to extend the rate range capability of gyroscopes developed for automotive applications this will typically result in degradation of other key performance parameters such as noise and bias.

Conventional vibrating structure gyroscopes having a planar ring vibrating structure made of metal or silicon or having a cylindrical vibrating structure give good overall performance. Planar ring vibrating structures are typically driven in Cos 2 θ vibration modes as shown schematically in FIGS. 1a and 1b of the accompanying drawings. One mode, having radial anti-nodes aligned along axes P, as shown in FIG. 1a, is excited as the primary mode. When the gyroscope is rotated around the axis normal to the plane of the ring Coriolis forces $F_c$ are developed which couple energy into the secondary mode, whose radial anti-nodes are aligned along axes S, as shown in FIG. 1b. The magnitude of the force is given by:

$$F_c = 2\,mv\Omega_{app} \quad (1)$$

where m is the modal mass, v is the effective velocity and $\Omega_{app}$ is the applied rotation rate. The primary mode vibration amplitude typically is maintained at a fixed level. This also maintains the velocity, v, at a fixed level and hence ensures that the developed Coriolis forces are directly proportional to the rotation rate, $\Omega_{app}$. The amplitude of secondary mode motion induced by these Coriolis forces may conventionally be enhanced by accurately matching the resonant frequencies of the primary and secondary modes. The motion is then amplified by the Q (measure of the relation between stored energy and the rate of dissipation of energy) of the secondary mode giving enhanced vibrating structure gyroscope sensitivity. When operating in this open loop mode the sensitivity (scalefactor) of the gyroscope will be dependent on the Q of the secondary mode which may vary significantly over the operating temperature range. This dependence may be eliminated by operating the gyroscope in a force feedback (closed loop) mode. In this mode the induced secondary mode motion is actively nulled with the applied force being directly proportional to the rotation rate.

A typical conventional closed loop control system for a vibrating structure gyroscope is shown schematically in FIG. 2 of the accompanying drawings. This conventional control system basically consists of two independent loops namely a primary loop 1 between a primary pick-off means 2 which acts as a motion detector output from the vibrating planar ring structure 3 and a primary drive means 4 which acts as a forcing input creating vibration in the structure 3. A secondary loop 5 is provided between a secondary pick-off means 6 and a secondary drive means 7.

The output signal 8 from the primary pick-off means 2 is amplified by an amplifier 9 and demodulated by demodulators 10 and 11. The demodulated signal from the demodulator 10 is passed first to a phase locked loop 12 which compares the relative phases of the primary pick-off and primary drive signals at the means 2 and 4 and adjusts the frequency of a voltage control oscillator 13 to maintain a 90° phase shift between the applied drive at means 4 and the resonator motion of the structure 3. This maintains the motion of the structure 3 at the resonance maximum. The demodulated output from the demodulator 11 is supplied to an automatic gain control loop 14 which compares the level of the output signal from the primary pick-off means 2 in the automatic gain control loop 14 to a fixed reference level $V_o$. This signal $V_o$ is applied at 15 to a voltage adder 16 and the output voltages therefrom supplied to the automatic gain control loop 14. The output voltage, from the automatic gain control loop 14 is remodulated at remodulator 17 at the frequency supplied by the voltage controlled oscillator 13 and then fed via an amplifier 18 to the primary drive means 4. The primary drive voltage level is adjusted in order to maintain a fixed signal level, and hence amplitude of motion, at the primary pick-off means 2.

The secondary loop 5 is such that the signal received from the secondary pick-off means 6 is amplified by amplifier 19 and demodulated by demodulators 20 and 21 to separate real and quadrature components of the rate induced motion. The real component is that which is in-phase with the primary mode motion. The quadrature component is an error term which arises due to the mode frequencies not being precisely matched. The demodulated baseband signal received from the demodulator 20 is filtered by a quadrature loop filter 22 and the demodulated baseband signal received from the demodulator 21 is filtered by a real loop filter 23 to achieve the required system performance in respect of bandwidth and noise. The signal received from the loop filter 22 is remodulated at remodulator 24 and passed to a voltage adder 25 where it is summed with the signal received from the loop filter 23 after remodulation by remodulator 26. The summed output signal from the voltage adder 25 is applied to the secondary drive means 7 via an amplifier 27 to maintain a null at the secondary pick-off unit 6. The real baseband signal SD (real), which is the output signal from the real loop filter 23 is taken off before remodulation at the remodulator 26, scaled and filtered at output filter 28 to produce the rate output signal 29 from the system. The real baseband signal SD (real) is directly proportional to the real secondary drive applied to the vibrating structure 3.

For this mode of operation the rate output $\Omega_{out}$ is given by:

$$\Omega_{out} = \frac{kSD(\text{real})g_{ppo}g_{sd}}{V_o w} \quad (2)$$

where $V_o$ is the fixed primary mode amplitude reference voltage set level, w is the primary mode resonance frequency, k is a constant including the modal mass and modal coupling coefficient, $g_{ppo}$ is the primary mode pick-off gain and $g_{sd}$ is the secondary mode driver gain.

For a gyroscope operating in this conventional closed loop mode, the minimum detectable rotation rate that can be resolved is determined by the sensitivity of the secondary mode pick-off means 6. This is determined by the electronic noise of the secondary pick-off amplifier 19. For a fixed pick-off gain, the only way to enhance the resolution of the vibrating structure gyroscope is to increase the secondary mode motion generated by a given applied rate, that is to increase the in loop scalefactor. This may be achieved by increasing the drive level of the primary mode to give a larger amplitude of motion, that is to increase the primary mode amplitude set level $V_o$. In practice there will be a limit to the maximum displacement for any given vibrating structure gyroscope design which limit may be set by a number of factors which include the available drive force, the fracture limit of the vibrating structure and non-linearities in the pick-off and drive means which conventionally are inductive, capacitive or piezo electric transducers.

The maximum applied rate that the vibrating structure gyroscope can measure is limited by the ability of the secondary drive means 7 to maintain a null in the secondary mode motion. The secondary drive means 7 applies a force to null the induced Coriolis force. For rotation rates above a certain level the magnitude of the Coriolis force is such that secondary drive can no longer apply sufficient force to null the motion causing the rate output to saturate. For typical conventional vibrating structure gyroscopes this saturation level corresponds to applied rotation rates of less than a few hundred degrees per second. For a given secondary drive means gain it is possible to increase the maximum measurable applied rate. This is achieved by reducing the primary mode amplitude which reduces the magnitude of the induced Coriolis force for a given rotation rate. However this solution will degrade the signal to noise performance of the vibrating structure gyroscope thus reducing the resolution undesirably.

There is thus a need for an improved control system for a vibrating structure gyroscope which is capable of measuring greater rotation rates whilst maintaining high resolution.

SUMMARY OF THE INVENTION

According to one aspect of the present invention there is provided a control system for a vibrating structure gyroscope having a vibrating structure, primary drive means and secondary drive means for putting and maintaining the vibrating structure in primary mode vibratory resonance, and primary pick-off means and secondary pick-off means for detecting vibration of the vibrating structure, which system includes a primary closed control loop for controllably varying the drive signal applied to the primary drive means, a secondary closed control loop for controllably varying the drive signal applied to the secondary drive means in order to maintain a null value at the secondary pick-off means, and means for actively adjusting the scalefactor in the primary and secondary closed control loops, which scalefactor active adjustment means includes means for dividing a rate response signal from the secondary control loop by a signal indicative of the amplitude of the primary mode vibration, means for filtering an output signal from the dividing means to provide an output indicative of the applied rate, and a variable scalefactor loop for receiving the output signal from the dividing means and using it actively to adjust a reference voltage set level of the primary closed control loop and thereby dynamically adjust the in loop scalefactor of the control system.

Preferably the scalefactor active adjustment means includes means for reducing the primary mode vibration amplitude for applied rotation rates above a selected absolute threshold rate value.

Conveniently the absolute threshold rate value selected is set at a value less than the rate output limit of the secondary closed control loop.

Advantageously the primary closed control loop includes means for demodulating the signal received from the primary pick-off means, a phase locked loop for comparing the relative phases of the primary pick-off and primary drive signals, a voltage controlled oscillator the frequency of which is adjusted by the phase locked loop to maintain a 90° phase shift between the signals supplied to the primary drive means and the motion of the vibrating structure, an automatic gain control loop for comparing the demodulated signal received from the primary pick-off means to a fixed reference voltage level, and a modulator for remodulating the output signal received from the automatic gain control loop at the frequency supplied by the voltage controlled oscillation to provide the controllably varied drive signal supplied to the primary drive means.

Preferably the secondary closed control loop includes means for demodulating and splitting the signal received from the secondary pick-off means into the real component and the quadrature component of a rate induced motion of the vibrating structure, loop filtering means for separately filtering the real and quadrature components, and means for remodulating and summing the filtered signal components for application to the secondary drive means.

Conveniently the variable scalefactor loop is connected between the demodulated output from the real component loop filtering means of the secondary closed control loop and the demodulated signal from the primary pick-off means.

Advantageously the variable scalefactor loop includes means for dividing the modulus of the input signal applied to the variable scalefactor loop into a fixed voltage reference level with the output limited to values less than or equal to one, and means for filtering the output and for using the filtered output for scaling the zero rate voltage value of the fixed reference voltage level of the automatic gain control loop of the primary closed control loop.

Preferably the control system includes means located between the secondary closed control loop and the variable scalefactor loop to divide the demodulated output from the real component loop filtering means of the secondary closed control loop by the demodulated signal from the primary closed control loop to provide an output signal proportional to the applied rate, which output signal forms the input to the variable scalefactor loop.

Alternatively the control system includes means located between the secondary closed control loop and the variable scalefactor loop to divide the demodulated output from the real component loop filtering means of the secondary closed control loop by the reference voltage level forming the output from the variable scalefactor loop, to provide an output signal proportional to the applied rate, which output signal forms the input to the variable scalefactor loop.

Conveniently the control system includes means for taking off part of the output signal forming the input to the variable scalefactor loop, scaling it and filtering it to provide an output signal indicative of the rate applied to the gyroscope.

Advantageously the control system is used with a vibrating structure gyroscope having a vibrating structure made from silicon.

For a better understanding of the present invention and to show how the same may be carried into effect, reference will now be made, by way of example, to the accompanying drawings, in which:

DETAILED DESCRIPTION OF THE INVENTION

Figure 1A:
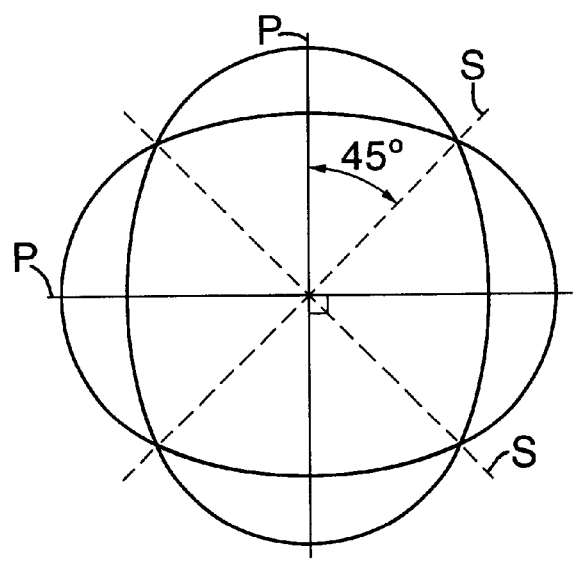
FIG. 1a shows diagrammatically for a vibrating structure gyroscope not according to the present invention a Cos2 θ vibration mode which is excited as the primary mode.
Figure 1B:
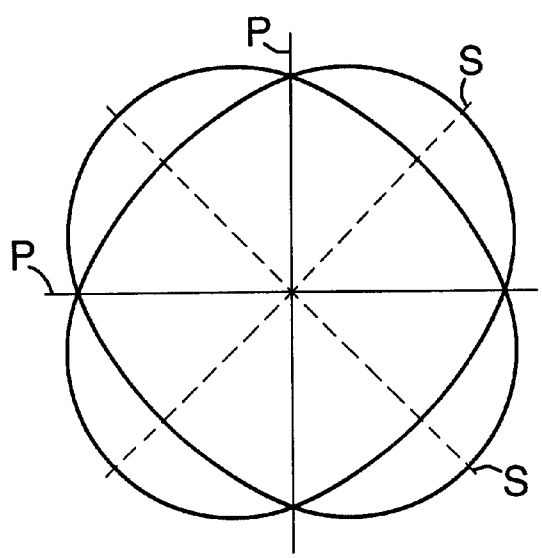
FIG. 1b shows schematically a Sin2 θ vibration mode excited when the vibrating structure gyroscope, not according to the present invention, is rotated around an axis normal to the plane of the vibrating structure so that Coriolis forces are developed which couple energy into the secondary mode.
Figure 2:
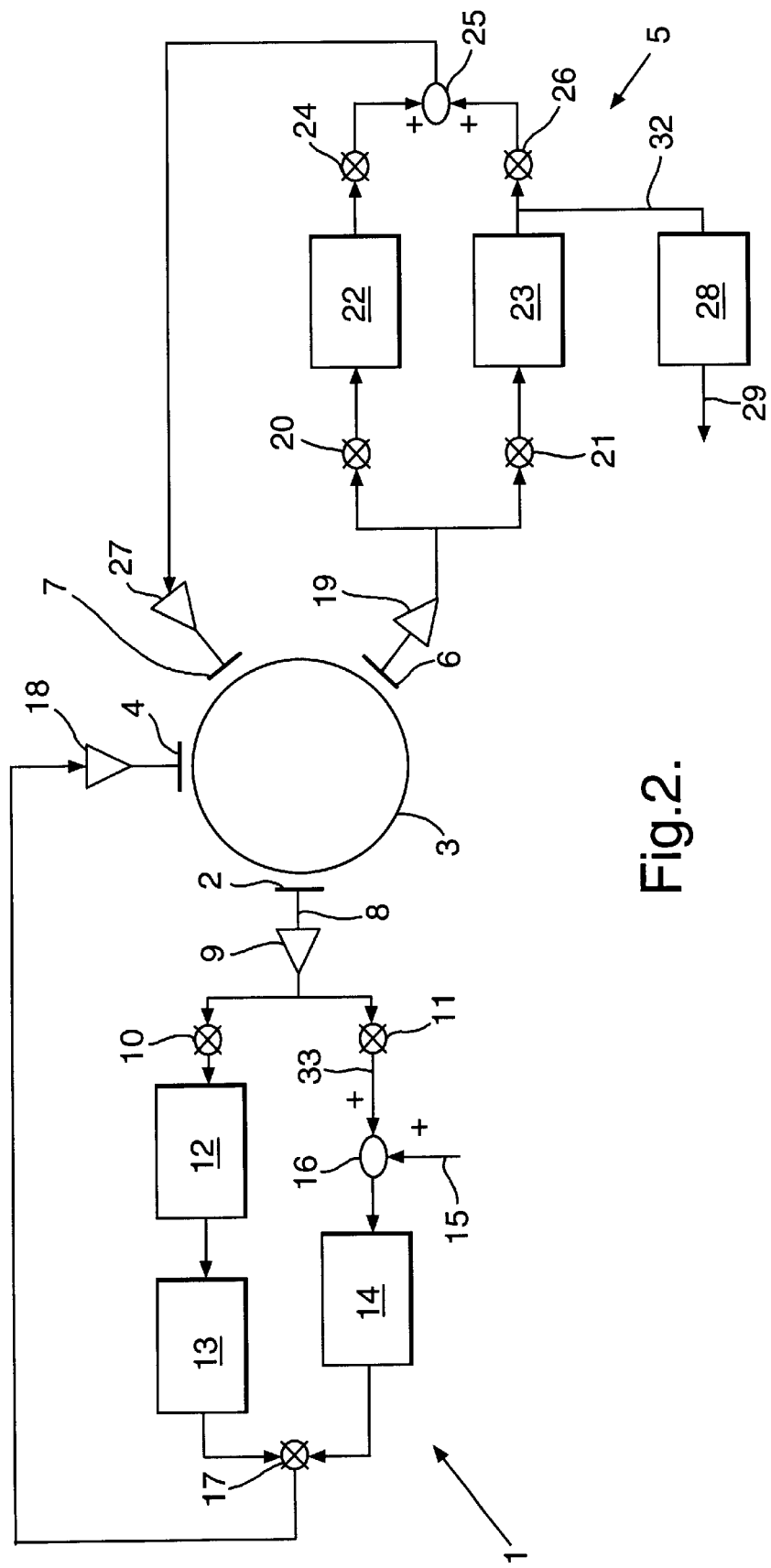
FIG. 2 is a schematic block diagram of a conventional control system not according to the present invention for a vibrating structure gyroscope.
Figure 3:
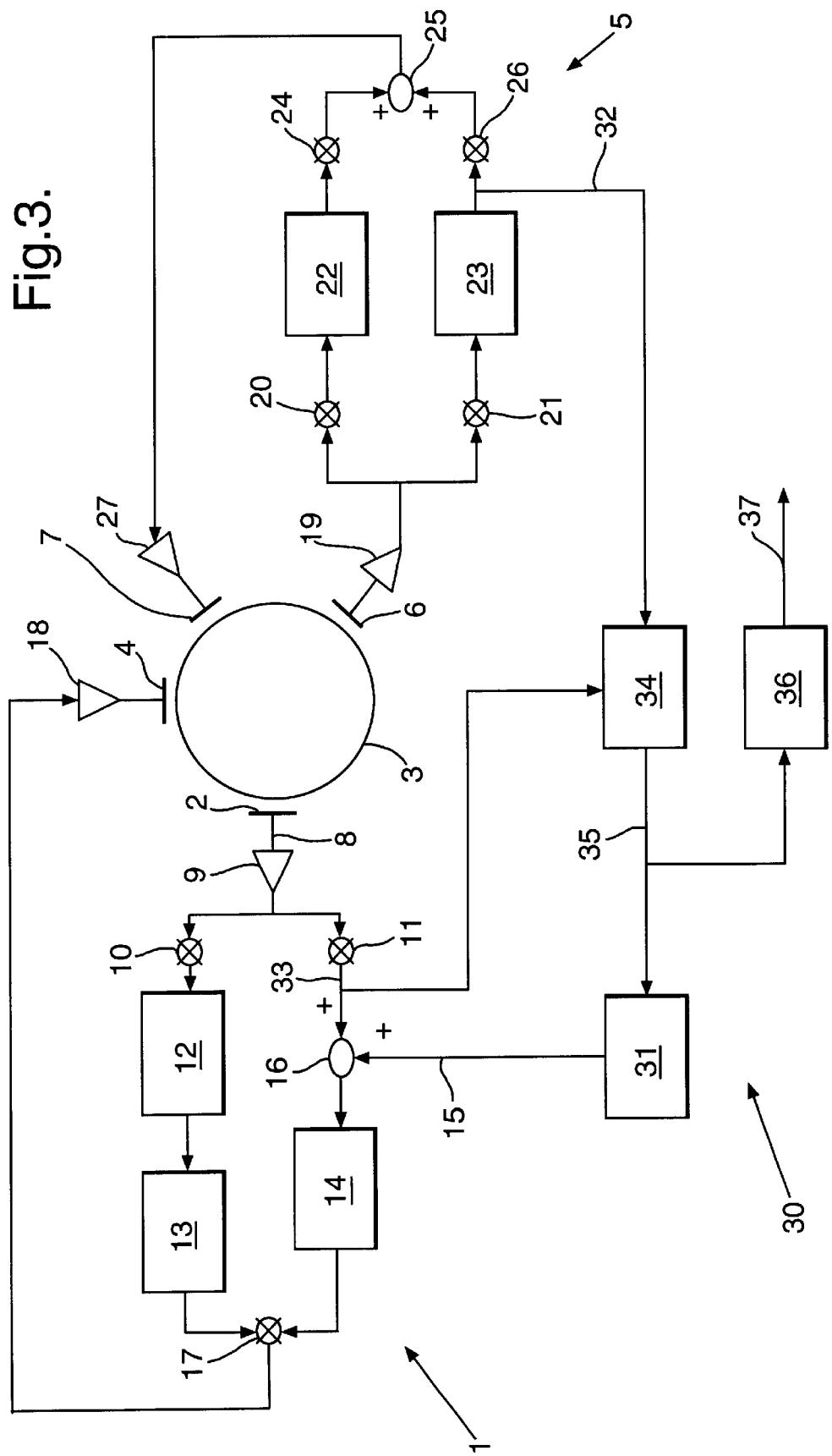
FIG. 3 is a generalised block diagram of a control system according to a first embodiment of the present invention.

A control system according to a first embodiment of the present invention for a vibrating structure gyroscope is shown in FIG. 3 of the accompanying drawings. In this embodiment of the invention the primary loop 1 and secondary loop 2 are very similar to the primary loop 1 and secondary loop 2 of the conventional control system shown in FIG. 2 and like components common to both FIGS. 2 and 3 will be given like reference numerals and not commented on further in any detail. Additionally although the control system of the present invention is shown and described as applied to a vibrating structure 3 made from silicon it can also be applied to the vibrating structure 3 made from metal or piezo ceramic material.

Adjusting the scalefactor as previously described has the problem, that once set, the scalefactor cannot subsequently be varied. In order to extend the rate range of the vibrating structure gyroscope without compromising the lower rate performance it is necessary actively to adjust the in-loop scalefactor at higher applied rates. A control system according to the present invention includes means 30 in the primary and secondary closed control loops 1, 5 to enable the gyroscope to measure high applied rotation rates whilst maintaining optimum resolution at low rotation rates. To this end the scalefactor active adjustment means 30 includes means for reducing the primary mode vibration amplitude for applied rotation rates above a selected absolute threshold rate value. The applied rates are positive or negative. The absolute threshold rate $\Omega_{Th}$ value is conveniently set at a value slightly below the normal output limit of the secondary drive means 7.

For applied rates below the threshold value the primary mode amplitude is maintained at a constant value. The secondary mode motion induced by the Coriolis forces will be directly proportional to the applied rate and is nulled in a conventional manner using the secondary drive means 7. As the applied rate exceeds the threshold value the primary mode amplitude is reduced therefore decreasing the secondary loop scalefactor. In this rate range the secondary drive is maintained around a constant, maximum, level and the primary mode amplitude varies inversely proportional to the applied rate. This is achieved by adjusting the primary mode amplitude reference voltage set level $V_{AGC}$ in the following manner:

$$V_{AGC} \propto 1/\Omega_{APP} \qquad (3)$$

To obtain a linear rate output over the entire operating range it is necessary to use the secondary drive level normalised using the primary mode amplitude. The rate output $\Omega_{out}$ is given by:

$$\Omega_{out} = k \frac{SD(real)g_{PPO}g_{SD}}{V_{PPD}w} \qquad (4)$$

where $V_{PPD}$ is the primary pick-off signal indicative of the primary mode amplitude.

To carry this into effect and provide an extended rate range capability, as shown in FIG. 3 the scalefactor adjustment means 30 are provided connected between the secondary closed loop 5 and the primary closed control loop 1. The means 30 includes means 34 located between the secondary closed control loop 5 and the variable scalefactor loop 31 for dividing the demodulated output 32 from the real component loop filtering means 23 of the secondary closed control loop 5 by the demodulated signal component 33 from the primary closed control loop 1 to provide an output signal 35 proportional to the applied rate. The output 35 forms the input to a variable scalefactor loop 31 (forming part of the means 30, and is used to scale the voltage reference level 15 supplied to the automatic gain control loop 14 of the primary pick-off signal 33. This output signal 35 is also scaled and filtered by means 36 to provide a final output signal $\Omega_{OUT}$ which is indicative of the rate applied to the gyroscope.

Figure 4:
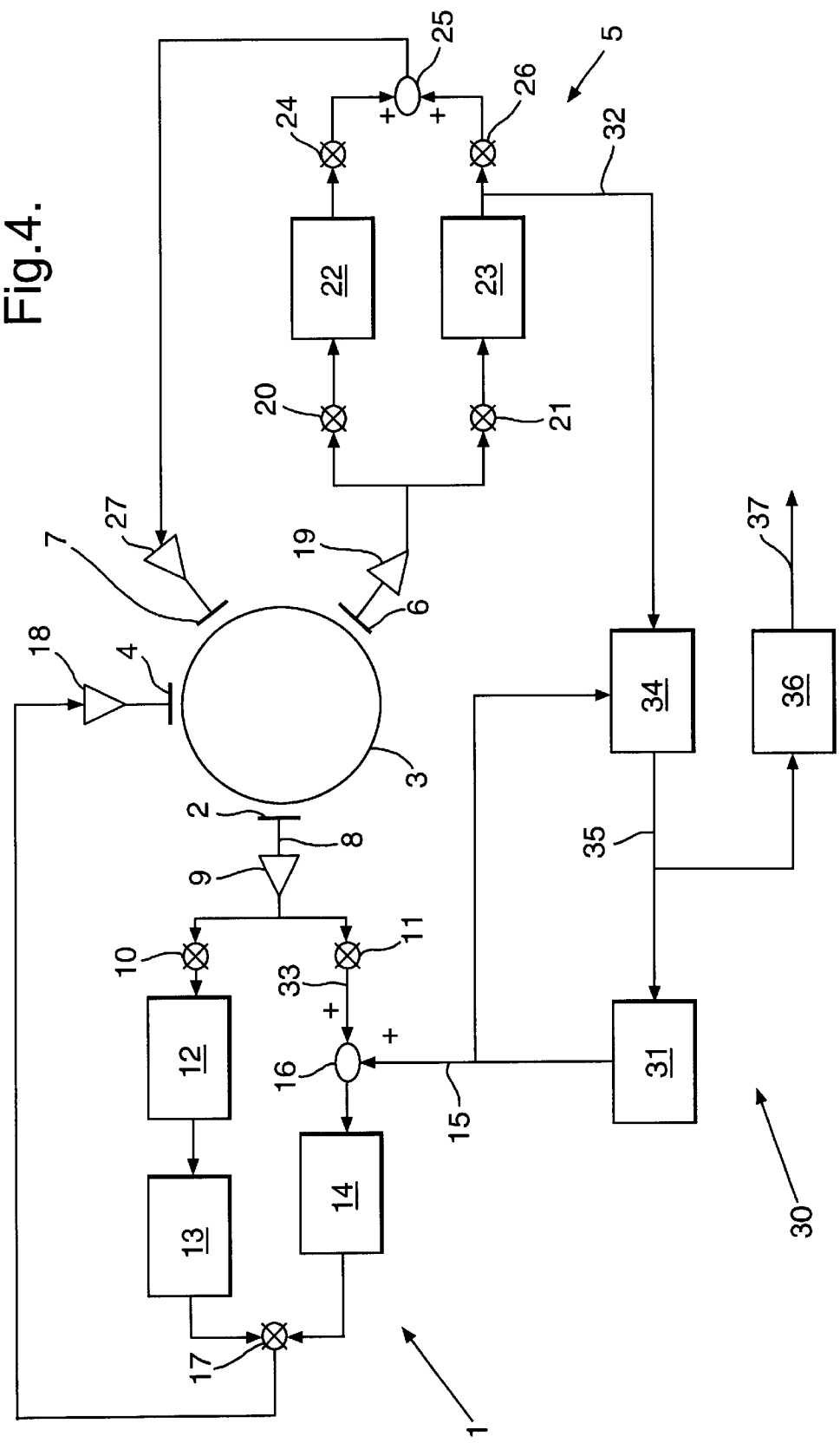
FIG. 4 is a generalised block diagram of a control system according to a second embodiment of the present invention.

Alternatively as shown in FIG. 4 of the accompanying drawings, the means 30 for actively adjusting the scalefactor may be implemented using the input voltage 15 instead of the demodulated other signal component 33 of the primary closed control loop 1 without changing the basic functionality of the control system. Thus as shown in FIG. 4 the means 34 which is located between the secondary control closed loop 5 and the variable scalefactor loop 31 to divide the demodulated output 32 from the real component loop filtering means 23 of the secondary closed control loop 5 by $V_{AGC}$ the reference voltage level 15 forming the output from the variable scalefactor loop 31 provides an output direct current signal 35 proportional to the applied rate, which output signal forms the input to the variable scalefactor loop 31. The signal 35 is also scaled and filtered as at 36 to provide the final output signal 37 ($\Omega_{out}$) which is indicative of the rate applied to the gyroscope.

Figure 5:
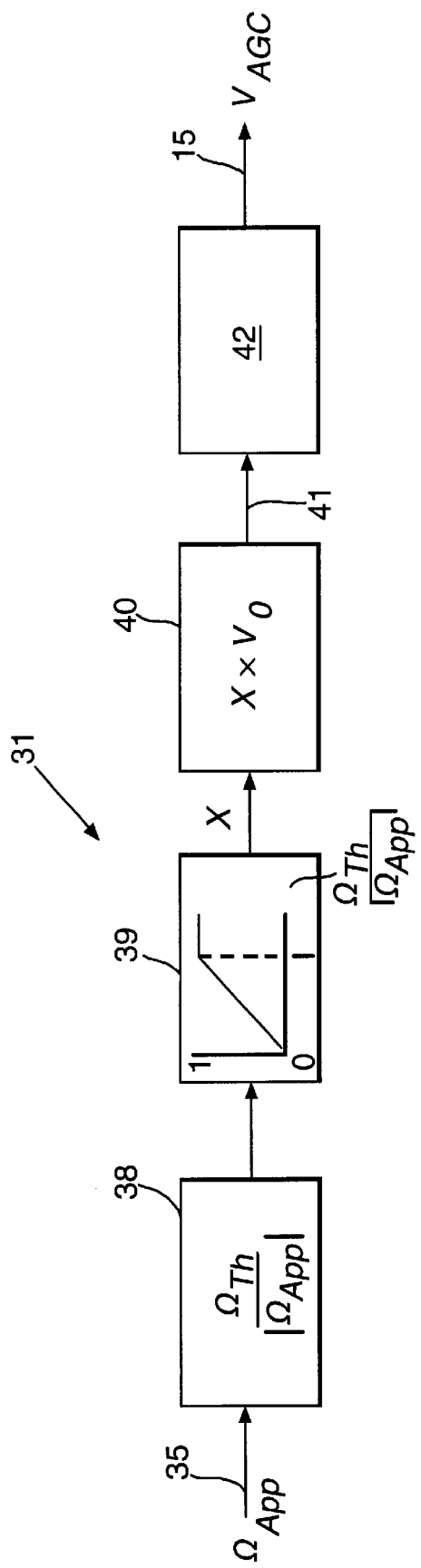
FIG. 5 is a schematic block diagram showing the functionality of a variable scalefactor loop utilised in a control system of the present invention.

The functionality of the variable scalefactor loop 31 is shown schematically in FIG. 5. The modulus of the input signal 35 ($\Omega$out) applied to the variable scalefactor loop 31 is divided at 38 into a fixed voltage reference level indicative of $\Omega_{TH}$ with the output value X limited to less than or equal to 1 at 39. This reference level sets the threshold rate value $\Omega_{T_h}$ and effectively limits the maximum real drive amplitude which may be applied to the secondary drive means 7. The output X is then used at 40 to scale $V_\theta$, the zero rate value of the automatic gain control reference voltage level $V_{AGC}$ (input 15). The output 41 from 40 is filtered in a loop filter 42 to provide the required dynamic response prior to application to the automatic gain control loop 14.

The variable scalefactor loop filtering has a critical role in determining the dynamic performance of the control system. As the bandwidth of the variable scalefactor loop 31 typically is low compared to that of the secondary (real) control loop 5, the primary amplitude will respond relatively slowly to rapid changes in the applied rate in the region above the threshold value $\Omega_{T_h}$ this means that the null at the secondary pick-off means 6 is predominantly maintained by adjusting the secondary drive means 7 under the control of the secondary control loop 5. For rapid increases in $\Omega_{APP}$ this will cause the instantaneous secondary drive levels to exceed the steady state condition for the equivalent applied rates. This will require that $\Omega_{T_h}$ be set to provide sufficient overdrive range to prevent the secondary drive "overshooting" and exceeding the output limit under these transient conditions. This is detrimental to the performance of this system as it restricts the usable dynamic range of the secondary control loop 5 under normal conditions, that is where there are no rapid changes in $\Omega_{APP}$. Extending the bandwidth of the variable scalefactor loop 31 will limit the extent of the secondary drive overshoot by enabling the automatic gain control loop 14 to respond more rapidly. Extending the band width will, however, degrade the noise performance of the system.

The detailed loop filter design of the control system according to the present invention is dependant upon the precise performance requirements. The usable rate range of the vibrating structure gyroscope to which it is applied, and which preferably has a vibrating structure made from silicon may be extended from the typical 100° per second to in excess of 10,000° per second. This is achieved without degradation in performance at the lower applied rates. There will, however, be some degradation of the noise performance as the rate is increased above the threshold level due to the reduced amplitude of primary motion.

What is claimed is:

1. A control system for vibrating structure gyroscope having a vibrating structure, primary drive means and secondary drive means for putting and maintaining the vibrating structure in primary mode vibratory resonance, and primary pick-off means and secondary pick-off means for detecting vibration of the vibrating structure, which system includes a primary closed control loop for controllably varying the drive signal applied to the primary drive means, a secondary closed control loop for controllably varying the drive signal applied to the secondary drive means in order to maintain a null value at the secondary pick-off means, and means for actively adjusting the scalefactor in the primary and secondary closed control loops which scalefactor active adjustment means includes means for dividing a rate response signal from the secondary control loop by a signal indicative of the amplitude of the primary mode vibration, means for filtering an output signal from the dividing means to provide an output indicative of the applied rate, and a variable scalefactor loop for receiving the output signal from the dividing means and using it actively to adjust a reference voltage set level of the primary closed control loop and thereby dynamically adjust the in loop scalefactor of the control system.

2. A control systems according to claim 1, wherein the scalefactor active adjustment means includes means for reducing the primary mode vibration amplitude for applied rotation rates above a selected absolute threshold rate value.

3. A control system according to claim 2, wherein the absolute threshold rate value selected is set at a value less than the rate output limit of the secondary closed control loop.

4. A control system according to claim 1, wherein the primary closed control loop includes means for demodulating the signal received from the primary pick-off means, a phase locked loop for comparing the relative phases of the primary pick-off and primary drive signals, a voltage controlled oscillator the frequency of which is adjusted by the phase locked loop to maintain a 90° phase shift between the signal applied to the primary drive means and the motion of the vibrating structure, an automatic gain control loop for comparing the demodulated signal received from the primary pick-off means to a fixed reference voltage level, and a modulator for remodulating the output signal received from the automatic gain control loop at the frequency supplied by the voltage controlled oscillator to provide the controllably varied drive signals applied to the primary drive means.

5. A control system according to claim 1, wherein the secondary closed control loop includes means for demodulating and splitting the signal received from the secondary pick-off means into the real component and of the quadrature component of rate induced motion of the vibrating structure, loop filtering means for separately filtering the real and quadrature components, and means for remodulating and summing the filtered signal components for application to the secondary drive means.

6. A control system according to claim 4, wherein the variable scalefactor loop is connected between a demodulated output from the real component loop filtering means of the secondary closed control loop and the demodulated signal from the primary pick-off means.

7. A control system according to claim 6, wherein the variable scalefactor-loop includes means for dividing the modulus of the input signal applied to the variable scalefactor loop into a fixed voltage reference level with the output limited to values less than or equal to one, and means for filtering the output and for using the output for scaling the zero rate voltage value of the fixed reference voltage level to the automatic gain control loop of the primary closed control loop.

8. A control system according to claim 7, including means located between the secondary closed control loop and the variable scalefactor loop to divide the demodulated output from the real component loop filtering means of the secondary closed control loop by the demodulated signal from the primary closed control loop to provide an output signal proportional to the applied rate, which output signal forms the input to the variable scalefactor loop.

9. A control system according to claim 7, including means located between the secondary closed control loop and the variable scalefactor loop to divide the demodulated output from the real component loop filtering means of the secondary closed control loop by the reference voltage level forming the output from the variable scalefactor loop to provide an output signal proportional to the applied rate, which output signal forms the input to the variable scalefactor loop.

10. A control system according to claim 8, including means for taking off part of the output signal forming the input to the variable scalefactor loop, scaling it and filtering it to provide an output signal indicative of the rate applied to the gyroscope.

11. A control system according to claim 1, when used with a vibrating structure gyroscope having a vibrating structure made from silicon.

* * * * *